Patented Feb. 13, 1945

2,369,560

UNITED STATES PATENT OFFICE 2,369,560

DRILLING FLUID

George R. Gray, Houston, Tex., assignor to Standard Oil Development Company, a corporation of Delaware No Drawing. Application April 9, 1942,
Serial No. 438,280

7 Claims. (Cl. 252—8.5)

The present invention is directed to drilling muds and particularly to drilling muds which are made up with saline waters.

One of the most vexing problems in the drilling of oil wells, particularly those which go to great depths, is the prevention of the loss of water from the drilling fluid. Water has a tendency to penetrate porous formations. The ordinary oil well passes through a great many of these formations so that in the course of drilling a deep well loss of water from the mud is considerable. The importance of the problem and a laboratory method for determining the filtration properties of drilling muds are discussed in a paper entitled Evaluation of filtration properties of drilling muds by Milton Williams and G. E. Cannon, published in the 1938 volume of Drilling and Production Practice by the American Petroleum Institute, beginning at page 20.

There are several reasons why the loss of water into porous formations is undesirable and harmful. If the porous formation contains oil, the water impedes the flow of oil into the well and results in the completion of a much poorer well than if the water were not lost into the oil bearing rock. Since electrical logs are influenced to a large extent by the fluid content of rock, the change in composition of the fluid within the pore space of rock as the result of filtration may often result in serious errors in electrical logs. In some cases the water lost into the sands may lead to erroneous results on drill stem tests. The loss of excessive quantities of water results in the building up of a thick filter cake of mud solids on the bore hole wall. This condition results in the hole being tight and sometimes causes the drill pipe to become stuck.

The problem of mud filtration control is particularly important and difficult in areas in which salt water must be used for the drilling mud, as in marine operations or where thick salt beds must be penetrated, as in west Texas. The salt flocculates ordinary drilling muds and causes the filtration of water to occur at excessive rates.

The object of the present invention is the production of a drilling mud which has the property of reducing loss of water by fil'ration to a minimum, particularly where the water is saline. This mud is characterized by the fact that under pressure in wells it forms a thin, almost impervious filter cake opposite the porous formations.

According to the present invention, water loss by filtration from drilling mud is reduced to a minimum by addition of gluten of any of the cereal grains to the drilling mud. The gluten in itself has been found useful in diminishing water loss by filtration. However, when the gluten has been treated with sodium hydroxide, preferably by making a suspension of the gluten in sodium hydroxide solution, even better results are obtained in treating the drilling muds.

In the processing of cereals to obtain various components therefrom, for example, starch and oil, it is customary to crush the grains and separate the starch-containing portion from the germ by a stream of water. Usually, the germ is then passed to a press where it is subjected to pressures to separate out the oil, the portion remaining in the press being commonly called gluten. Various cereal grains, such as wheat, barley, rye and Indian corn, may be the starting material from which the gluten is separated. It may be stated generally that gluten is a protein-rich product obtained from the germ of cereal grains.

In order to demonstrate the nature and magnitude of the effect of gluten on the filtration characteristics of a drilling mud, particularly one made with saline water, experiments were conducted by synthesizing a drilling mud with 20% by weight of native clay from Finley, Texas, in a saturated sodium chloride solution, determining the filtration rate of this mud and comparing it to its filtration rate with additions of various percentages of gluten and gluten admixed with various percentages of sodium hydroxide solution.

The filtration experiments were conducted in a Baroid wall building low pressure tester (described in Drilling mud, May 1938), and pressure of 100 lbs./sq. in. was applied to the mud. In each test, a 300 gram sample of mud was employed. The results are tabulated below. It will be noted that the employment of gluten decreased the filtration an appreciable amount. It will also be observed that the employment of sodium hydroxide with the gluten greatly improved the effectiveness of the drilling mud. The extreme left-hand column indicates the amount of filtration in the blank sample, the next two columns indicate the filtration with gluten added to the mud, and the remaining columns indicate the results obtained when the mud is treated with a suspension of gluten in sodium hydroxide.

| Gluten  percent by weight | 0 | 1 | 2 | 2 | 2 | 2 | 2 |
|---|---|---|---|---|---|---|---|
| NaOH  do | 0 | 0 | 0 | 0.6 | 0.8 | 1 | 1.2 |
| Volume of filtrate after 30 min. in cc | 60 | 50 | 51 | 26 | 31 | 34 | 40 |

The nature and objects of the present invention having been thus described, what is claimed as new and useful and is desired to be secured by Letters Patent is:

1. A method for retarding the filtration of water from salt water drilling fluid comprising adding gluten to said salt water drilling fluid.

2. A method for preventing the filtration of water from an aqueous drilling fluid into porous formations traversed by a bore hole comprising adding a suspension of gluten in sodium hydroxide solution to the aqueous drilling fluid.

3. A method for preventing the filtration of water from a salt water drilling fluid into porous formations traversed by a bore hole comprising adding a suspension of gluten in sodium hydroxide solution to said salt water drilling fluid.

4. A drilling fluid for use in the drilling of porous formations having an aqueous base and containing a suspension of gluten in sodium hydroxide solution.

5. A drilling fluid for use in the drilling of porous formations comprising a concentrated salt solution containing gluten.

6. A drilling fluid for use in the drilling of porous formations comprising a concentrated salt solution, gluten and a substantial amount of sodium hydroxide solution.

7. An aqueous drilling fluid for use in the drilling of porous formations containing approximately 2% of gluten and 1% of sodium hydroxide by weight.

GEORGE R. GRAY.